(No Model.)

C. BRADFORD.
MACHINE FOR MAKING ICE, &c.

No. 422,565. Patented Mar. 4, 1890.

WITNESSES.
C. H. H. Brown,
H. A. Barton

INVENTOR.
C. Bradford
per C. t E. W. Bradford
ATTORNEYS.

UNITED STATES PATENT OFFICE.

CHESTER BRADFORD, OF INDIANAPOLIS, INDIANA, ASSIGNOR TO LAFAYETTE D. RAILSBACK, OF SAME PLACE.

MACHINE FOR MAKING ICE, &c.

SPECIFICATION forming part of Letters Patent No. 422,565, dated March 4, 1890.

Application filed April 6, 1889. Serial No. 306,256. (No model.)

*To all whom it may concern:*

Be it known that I, CHESTER BRADFORD, a citizen of the United States, residing at Indianapolis, in the county of Marion and State of Indiana, have invented certain new and useful Improvements in Machines for Making Ice, &c., of which the following is a specification.

The object of my said invention is to provide a means whereby in machines for making ice, ice-cream, &c., embodying a freezing-cylinder, the liquid to be frozen may be supplied to said cylinder uniformly. This object is accomplished by mounting the pan containing the liquid upon vertical rods or ways and providing mechanism by which it may be raised or lowered, so that the lower side of the freezing-cylinder therein may enter a uniform distance into the liquid without reference to the quantity of the liquid in said pan, as will be hereinafter more particularly described and claimed.

Figure 1:
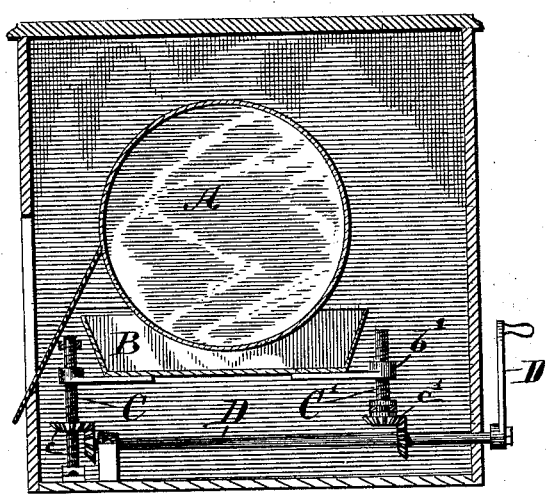
Figure 2:
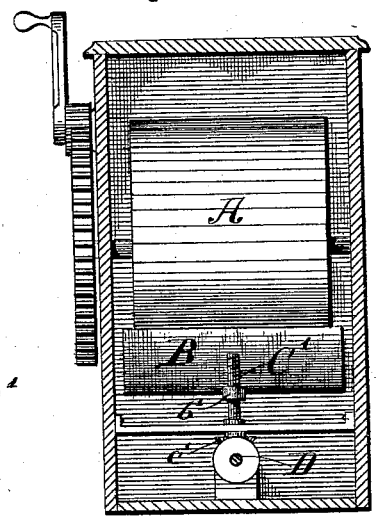
Figure 3:
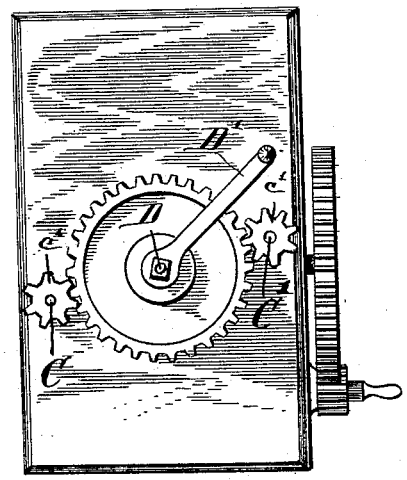
Figure 4:
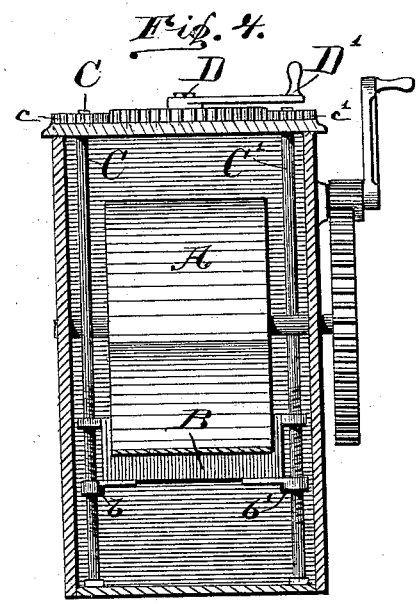

Referring to the accompanying drawings, which are made a part hereof, and on which similar letters of reference indicate similar parts, Figure 1 is a longitudinal vertical sectional view of the machine embodying my said invention; Fig. 2, a front elevation of the interior thereof, the casing being shown in section; Fig. 3, a top or plan view of an alternative construction; and Fig. 4, a sectional view through the casing and scraper of the machine, the other parts being in elevation.

In said drawings the portions marked A represent the freezing-cylinder of the machine; B, the pan containing the liquid to be frozen; C C', screw-rods upon which said pan is mounted, and D a shaft by which, through gearing, said screw-rods are revolved, and said pan thus raised or lowered.

Except as to the means of adjusting the pan, the machine illustrated herein is of a well-known construction, and therefore will not now be further described, except incidentally in describing the invention.

The pan B has ears $b\,b'$, in which are screw-threaded holes through which the vertical screw-rods pass. Said rods C C' are mounted in suitable bearings, as shown, and are provided with small gear-wheels $c\,c'$. The shaft D is also mounted in suitable bearings, as shown, and has corresponding gear-wheels which engage with the gear-wheels on the screw-shafts. It also has upon one end a crank or hand-wheel D', by which it may be turned, and the pan B thus raised or lowered, as will be readily understood. In the alternative construction I have shown the rods on the sides of the cylinder and continued to the top of the machine, where small pinions are placed thereon which engage with a single large spur gear-wheel instead of the two bevel gear-wheels, as in the other construction. This change, however, is no departure from my invention, and other changes in construction may likewise be made, if desired.

In using machines of this character it is often desirable to vary the quantity of liquid to be frozen as a greater or less quantity of the product is desired. In machines with stationary pans, if a large quantity of the liquid is placed therein at one time, the wheel will be immersed so deeply that a larger quantity of the liquid will be taken up than can be properly frozen, while if only a small quantity is placed therein considerable time is lost in stopping to renew the supply. By the use of my invention the whole quantity desired can be placed in the machine at once and a uniform immersion at the same time be secured, as will be readily understood.

Having thus fully described my said invention, what I claim as new, and desire to secure by Letters Patent, is—

The combination of the freezing-cylinder, the liquid-pan having lugs thereon in which are screw-threaded holes, vertical screw-rods passing through said lugs, and gearing whereby said screw-rods may be revolved and the pan thus raised or lowered, substantially as set forth.

In witness whereof I have hereunto set my hand and seal, at Indianapolis, Indiana, this 4th day of April, A. D. 1889.

CHESTER BRADFORD. [L. S.]

Witnesses:
E. W. BRADFORD,
W. A. BARTON.